United States Patent
Spink, Jr. et al.

(10) Patent No.: US 7,497,710 B2
(45) Date of Patent: Mar. 3, 2009

(54) JACK ASSEMBLY HAVING ACTUATOR WITH DUAL-BEAM BIFURCATED CONTACTS

(75) Inventors: William E. Spink, Jr., Goodyear, AZ (US); Daniel E. DelVecchio, Tempe, AZ (US)

(73) Assignee: Trompeter Electronics, Inc., Mesa, AZ (US)

( * ) Notice: Subject to any disclaimer, the term of this patent is extended or adjusted under 35 U.S.C. 154(b) by 0 days.

(21) Appl. No.: 11/939,208

(22) Filed: Nov. 13, 2007

(65) Prior Publication Data

US 2008/0113564 A1    May 15, 2008

Related U.S. Application Data

(60) Provisional application No. 60/866,030, filed on Nov. 15, 2006.

(51) Int. Cl.
*H01R 29/00* (2006.01)
(52) U.S. Cl. .................................. 439/188; 439/944
(58) Field of Classification Search ................ 439/188, 439/668, 944; 200/51.1
See application file for complete search history.

(56) References Cited

U.S. PATENT DOCUMENTS

| | | | | |
|---|---|---|---|---|
| 5,071,362 A | * | 12/1991 | Martens et al. | ............. 439/188 |
| 5,147,992 A | * | 9/1992 | Eriksen et al. | ............. 200/51.1 |
| 5,246,378 A | * | 9/1993 | Seiceanu | ................. 439/188 |
| 5,518,414 A | * | 5/1996 | Antonini et al. | ............. 439/188 |
| 5,702,262 A | * | 12/1997 | Brown et al. | ................ 439/188 |
| 7,226,309 B1 | * | 6/2007 | Gretz | ........................ 439/460 |

* cited by examiner

*Primary Examiner*—Thanh-Tam T Le
(74) *Attorney, Agent, or Firm*—Sonnenschein Nath & Rosenthal LLP; Brian R. McGinley (57) ABSTRACT

A jack assembly having a body, a first conductor extending longitudinally through the body between a first jack at the first end of the body and a second jack at the second end of the body, a second conductor extending longitudinally through the body between a third jack at the first end of the body and a fourth jack at the second end of the body, and a spring assembly coupled to the body. The spring assembly includes first and second conductive arms extending from a non-conductive coupling device. Each arm includes a distal end having a bifurcated dual-beam configuration. Each arm is biased outwardly from the non-conductive coupling device so as to contact a respective one of the conductors. Each arm has a first position in electrical communication with the respective conductor and being movable to a second position electrically isolated from the respective conductor.

11 Claims, 10 Drawing Sheets

JACK ASSEMBLY HAVING ACTUATOR WITH DUAL-BEAM BIFURCATED CONTACTS

CROSS-REFERENCE TO RELATED APPLICATION

The present application claims benefit under 35 U.S.C. § 119(e) to U.S. Provisional Application No. 60/866,030, filed on Nov. 15, 2006, which is hereby incorporated by reference in its entirety.

BACKGROUND OF THE INVENTION

1. Field of the Invention

The present invention is related to a jack assembly having dual-beam bifurcated contacts.

2. Background Art

Figure 1:
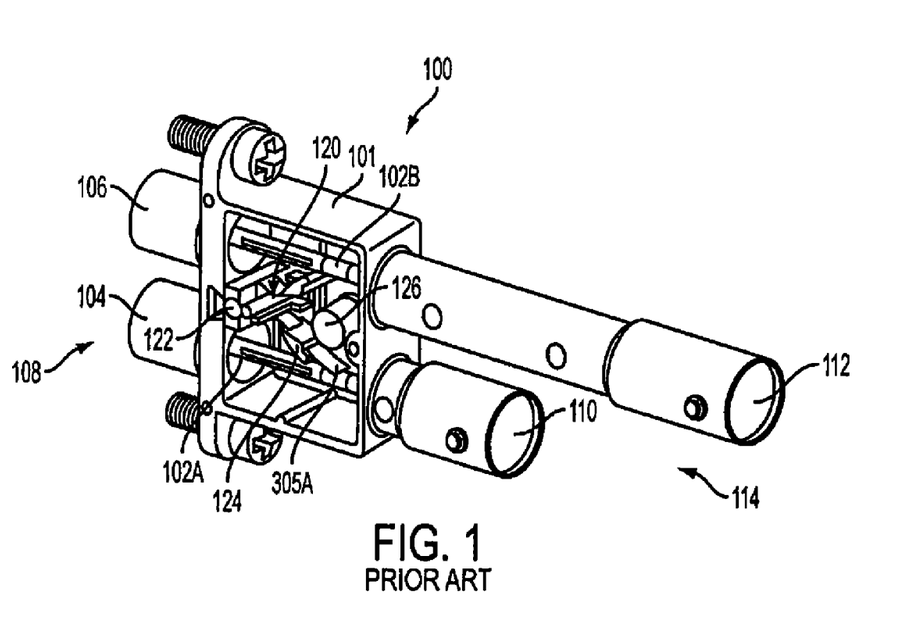
FIG. 1 shows a conventional patch jack assembly.

In the telecommunications industry (including, for example, telephone, television broadcast, high-definition television and video, and serial data interface (SDI)), a jack assembly is used to connect two signal lines and to facilitate rerouting of the lines, if necessary. For example, FIG. 1 shows a typical patch jack assembly 100 including a housing or jack body 101, having a pair of parallel, substantially cylindrical, central conductors 102A and 102B, running therethrough. Each central conductor 102A, 102B runs from a front port 104, 106 at a front end 108 of the housing 101 to a rear port 110, 112 at a rear end 114 of the housing 101. The front ports 104, 106 are typically configured as WECo (Western Electric Company) or mini-WECo jacks, while the rear ports 110, 112 are typically configured as BNC or mini-BNC format jacks.

The rear ports 110, 112 are generally configured to receive the lines for which connection is desired. A spring arrangement 120 within the housing 101 provides a normally closed connection between the central conductors 102A, 102B. Thus, the lines connected to the rear ports 110, 112 of the patch jack assembly 100 will be electrically connected by the spring arrangement 120 in the housing 101.

Figure 3:
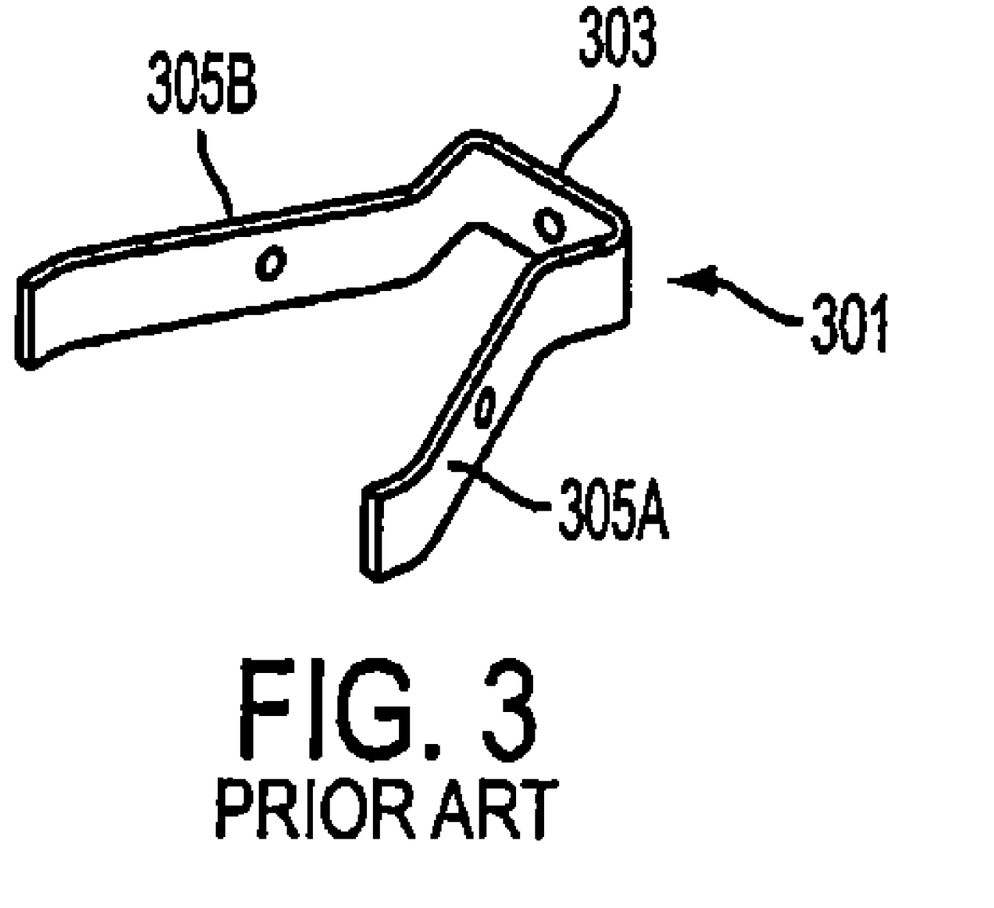
FIG. 3 illustrates a conventional conductive spring used in the patch jack assembly of FIG. 1.

A typical configuration of the spring arrangement 120 is a wishbone-shaped spring, such as spring 301 shown in FIG. 3, having a central portion 303 and two spring arms 305A, 305B. The central portion 303 is mounted to, but electrically isolated from, housing 101 by coupling device 122. A distal end of each spring arm 305A, 305B is configured to contact an adjacent central conductor 102A, 102B. The distal ends are held against the central conductor 102A, 102B by the restorative force of the spring. This configuration provides a conductive path between the two central conductors 102A, 102B to form the normally closed connection.

Each arm 305A, 305B has a non-conductive actuator 124 (not shown in FIG. 3) attached to it. A plug inserted into one of the front ports 104, 106 of the housing 101 will engage the actuator 124 and push the spring arm 305A, 305B away from the central conductor 102A, 102B (against the restorative force of the spring arm) causing the electrical connection to be broken. In a terminated variant, the spring arm 305A, 305B is pushed into contact with a ground post, or termination resistor 126, causing the opposite central conductor to be electrically connected to ground through the termination resistor. In a non-terminated variant, the spring arm 305A, 305B is pushed away from the central conductor 102A, 102B, but remains non-terminated or open-circuited.

Figure 2A:
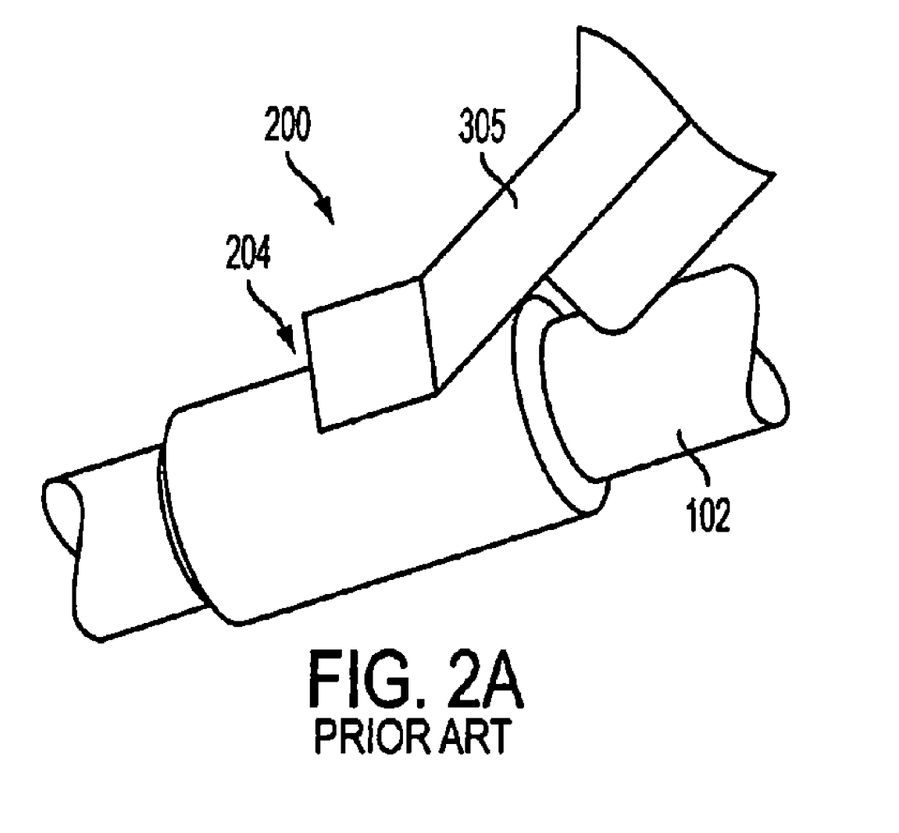
FIG. 2A shows a conventional electrical contact pair.
Figure 2B:
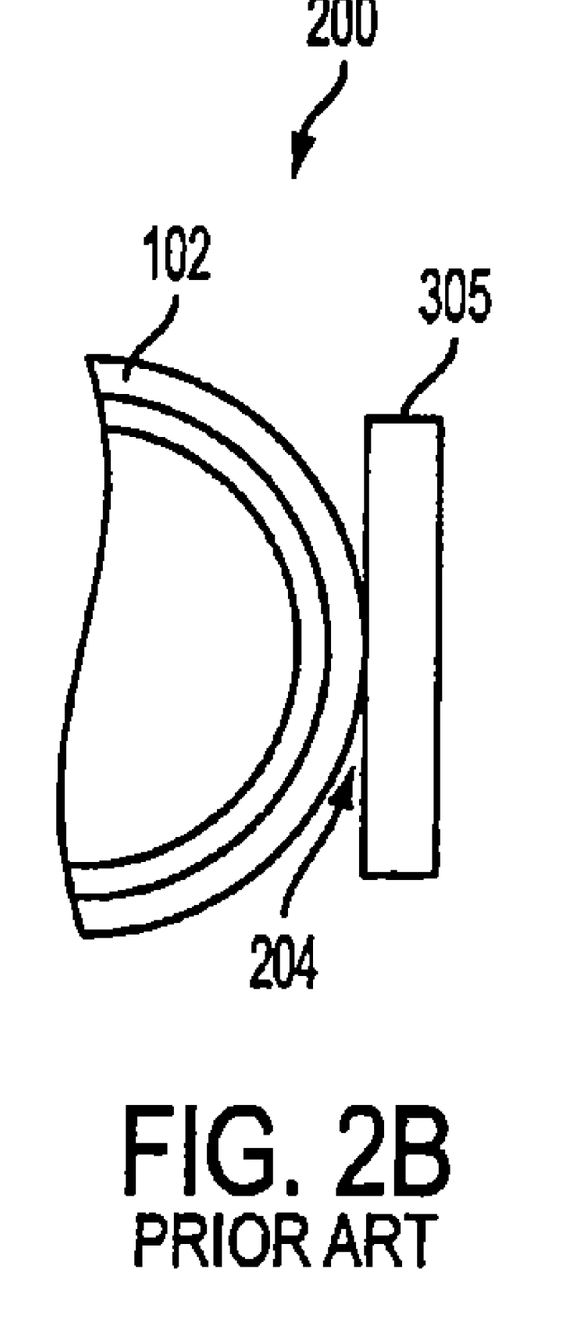
FIG. 2B shows a partial cross-sectional view of a conventional electrical contact pair.

Reliability of the connections made by the patch jack assembly 100 is important. However, a shortcoming of conventional patch jack assemblies is found in the spring assembly. As seen in the electrical contact pair 200 shown in FIG. 2A and FIG. 2B, the spring arms 305 of the spring 301 are typically thin and flat with a rectangular cross-section, while the central conductors 102 are typically cylindrical in shape. Because of these shapes, the resulting contact point 204 is often a single point or a narrow line. Dirt, dust, or other debris entering the housing 101 can get stuck between spring arm 305 and conductor 102, and make an intermittent or even cold (i.e., non-conducting) connection at point 204.

U.S. Patent Appl. Publication No. 2005/0148225 (i.e., U.S. patent application Ser. No. 10/752,035, filed Jan. 7, 2004), the full disclosure of which is incorporated herein by reference, discloses a V-notch actuator that attempts to solve the problems of convention actuators. There is still a need, however, for an actuator that produces an electrical connection that is more reliable and is less susceptible to failure.

BRIEF SUMMARY OF THE INVENTION

Provided herein is generally a jack assembly having a body, a first conductor extending longitudinally through the body between a first jack at the first end of the body and a second jack at the second end of the body, a second conductor extending longitudinally through the body between a third jack at the first end of the body and a fourth jack at the second end of the body, and a spring assembly coupled to the body. The spring assembly includes first and second conductive arms extending from a non-conductive coupling device. Each arm includes a distal end having a bifurcated dual-beam configuration. Each arm is biased outwardly from the non-conductive coupling device so as to contact a respective one of the conductors. Each arm has a first position in electrical communication with the respective conductor and is movable to a second position electrically isolated from the respective conductor.

Additional embodiments and configurations are described below with reference to the incorporated drawings. For example, in one embodiment at least one arm of the spring assembly includes a secondary beam extending from a medial region of the arm.

BRIEF DESCRIPTION OF THE DRAWINGS/FIGURES

The accompanying drawings, which are incorporated herein and form a part of the specification, illustrate the jack assembly presented herein and, together with the description, further serve to explain the principles of the jack assembly and to enable a person skilled in the pertinent art to make and use the jack assembly.

The presented jack assembly will now be described with reference to the accompanying drawings. In the drawings, like reference numbers generally indicate identical or functionally similar elements. Additionally, the left-most digit(s) of a reference number generally identifies the drawing in which the reference number first appears.

DETAILED DESCRIPTION OF THE INVENTION

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications. For example, the descriptions provided below are generally described in the environment of a patch jack assembly. One of skill in the art, however, will recognize that the teachings presented herein are applicable to other environments including alternative jack assemblies such as, for example, a high definition video dual patch module.

Overview

According to an exemplary embodiment, there is presented a jack assembly having an electrical contact pair. The electrical contact pair comprises a substantially cylindrical first conductor and an elongated second conductor. The second conductor has a first end held in a fixed position relative to the first conductor and a second end movable relative to the first conductor. The second end is normally biased against the first conductor based on a spring-type resiliency of the second conductor. The second conductor also includes a non-conductive actuator.

The second end of the second conductor (i.e., the contact end) is bifurcated, having a dual-beam configuration which includes two substantially parallel beams. The dual-beam configuration engages with the first conductor. The dual beams are spaced apart a distance less than the diameter of the first conductor so that engagement of the actuator with the first conductor causes deflection of the beams from a free state to a deflected (i.e., loaded) state. Using a bifurcated contact provides for multiple points of contact/engagement with the first conductor, increases Hertzian forces, reduces susceptibility to failure caused by contamination, provides wipe-zones to clear debris from the surface of the first conductor, and ultimately yields a more reliable connection.

The electrical contact pair may be used in a variety of applications. In one embodiment, the electrical contact pair may be used in a high definition video dual patch (HDVDP) module for use in broadcast and/or telecommunications industries including, for example, high definition video and serial data interface (SDI) applications. In another embodiment, the electrical contact pair may be used in a feed-through jack. In yet another embodiment, the electrical contact pair may be used in a patch jack.

In the example embodiment of an HDVDP module, the module includes a body, first and second substantially cylindrical conductors, and a spring assembly (or actuator assembly). The spring assembly is generally wishbone-shaped. The body has a first end and a second end. The first conductor extends longitudinally through the body between a first jack at the first end and a second jack at the second end. The second conductor extends longitudinally through the body between a third jack at the first end and a fourth jack at the second end.

The connector housing is formed, for example, from zinc alloy #3 per ASTM-B240 with electroless nickel per AMS-2404C. The actuator and center conductors are made, for example, from beryllium copper per ASTM-B194/196/197 and are gold plated per MIL-G-45204. Dielectric insulators isolating the center conductors from the housing are formed, for example, from PTFE (polytetrafluoroethylene) per ASTM-D1710.

The spring assembly includes first and second conductive arms. Each arm has a bifurcated dual-beam configuration adapted to contact a respective one of the conductors. Each of the arms has a first position in electrical communication with the respective conductor and a second position electrically isolated from the respective conductor. A plug inserted into the first jack causes the first arm to move from the first position to the second position. A plug inserted into the third jack causes the second arm to move from the first position to the second position.

The electrical contact pair may also be used, for example, in a variety of other telecommunications, video, high-definition video and television, serial data interface (SDI) and RF (radio frequency) applications. For example, the contact pair may be used in a communications jack, a patch jack such as the 75 Ohm High Frequency, Dual Coaxial, Normal-Thru Mini-WECo Patch Jack, available from Trompeter Electronics, Inc. of Mesa, Ariz., under part numbers J314MW (non-terminated) and J314MWT (terminated), or a digital cross-connect assembly of the type used, for example, in telephone central offices.

It is to be appreciated that the substantially cylindrical conductors and the conductive arms of the spring assembly may be made of any material that allows communication of signals through the conductors, such as metal, alloys, or the like. In one embodiment, the conductors and arms are made from beryllium copper per ASTM-B194/196/197 and are gold plated per MIL-G-45204. In another exemplary embodiment, the arms are formed from a thin strip of beryllium copper.

Further embodiments, features, and advantages of the present invention, as well as the structure and operation of the various embodiments of the present invention, are described in detail below with reference to the accompanying drawings.

Electrical Contact Pair

Figure 4A:
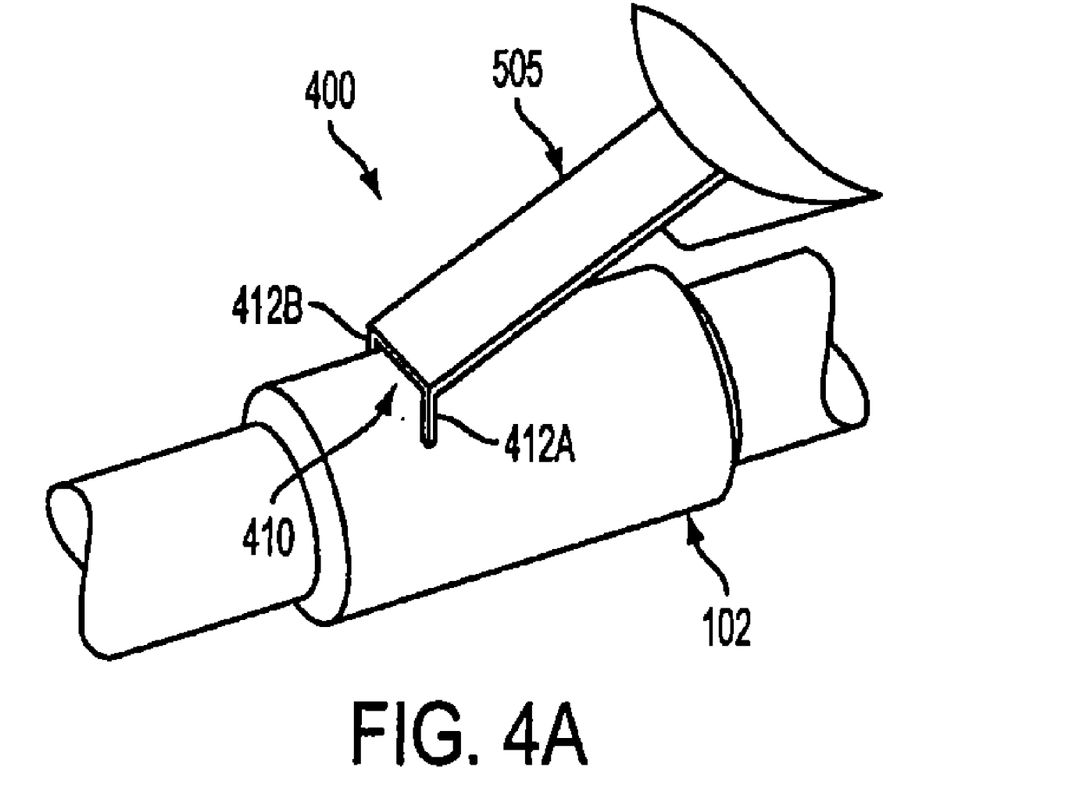
FIG. 4A shows an electrical contact pair in accordance with one embodiment described herein.
Figure 4B:
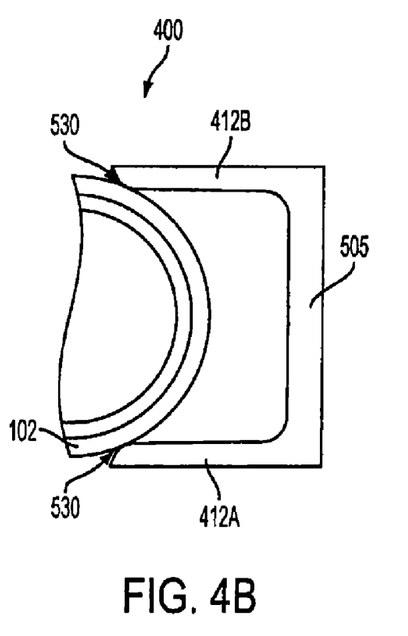
FIG. 4B shows a partial cross-sectional view of the electrical contact pair of FIG. 4A.
Figure 5A:
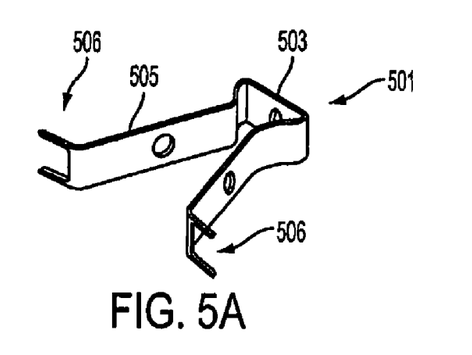
FIG. 5A shows a conductive spring in accordance with one embodiment described herein.
Figure 5B:
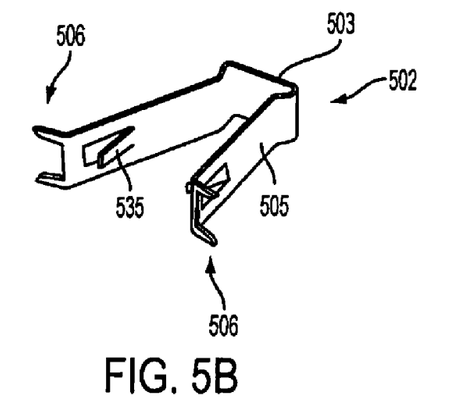
FIG. 5B shows an alternative conductive spring in accordance with an alternative embodiment described herein.
Figure 8:
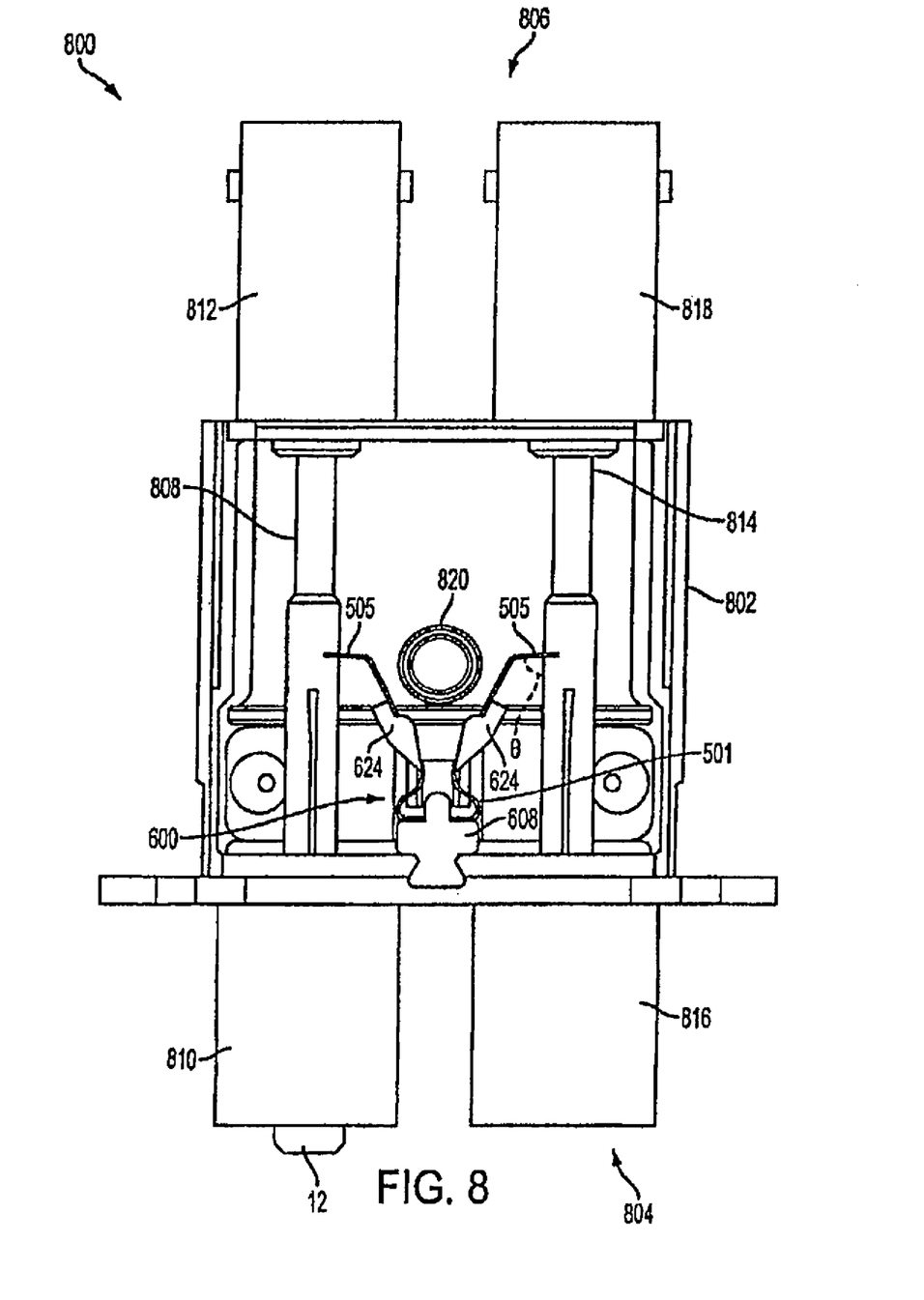
FIG. 8 is a perspective view of the spring assembly of FIG. 6 employed in a patch jack assembly.

FIG. 4A shows an electrical contact pair 400 in accordance with one embodiment described herein. FIG. 4B shows a partial cross-sectional view of electrical contact pair 400. FIG. 5A shows a conductive spring 501 in accordance with one embodiment described herein. FIG. 5B shows an alternative conductive spring 502 in accordance with an alternative embodiment described herein. Each conductive spring 501, 502 includes outwardly biased arms 505. Arms 505 have bifurcated distal ends having a dual-beam configuration 506 for engaging a conductor, such as central conductor 102 used in the patch jack 100 described with reference to FIG. 1. The dual-beam configuration 506 includes at least two substantially-parallel beams, but may include more. Further, dual-beam configuration 506 is adapted to contact central conductor 102 and form an angle $\theta$ (as shown in FIG. 8) with central conductor 102. Angle $\theta$ is generally between about 45 degrees and about 90 degrees, but can range from about 30 degrees to about 150 degrees.

As shown in FIG. 4A, the bias of the spring maintains contact between beams 412 of bifurcated contact 410 and a circumferential surface of central conductor 102. Dual beams 412A, 412B provide for multiple points of contact/engagement with conductor 102, increase Hertzian forces, reduce susceptibility to failure caused by contamination, and yield a more reliable connection. The distal ends of dual beams 412A, 412B also provide wipe-zones 530 that help clear debris and build-up in the area of contact. Such wipe-zones 530 add to the reliability of the connection.

It is to be appreciated that conductive springs 501, 502 can be made of any material that allows communication of signals through the conductors, such as metal, alloys, or the like. In one embodiment, for example, conductive springs 501, 502 are made from beryllium copper per ASTM-B194/196/197 and are gold plated per MIL-G-45204.

Spring 502 includes a secondary beam 535 extending from a medial region of arm 505. Secondary beam 535 is used to facilitate contact between spring 502 and a termination point, or ground post, as described below.

Spring or Actuator Assembly

Figure 6:
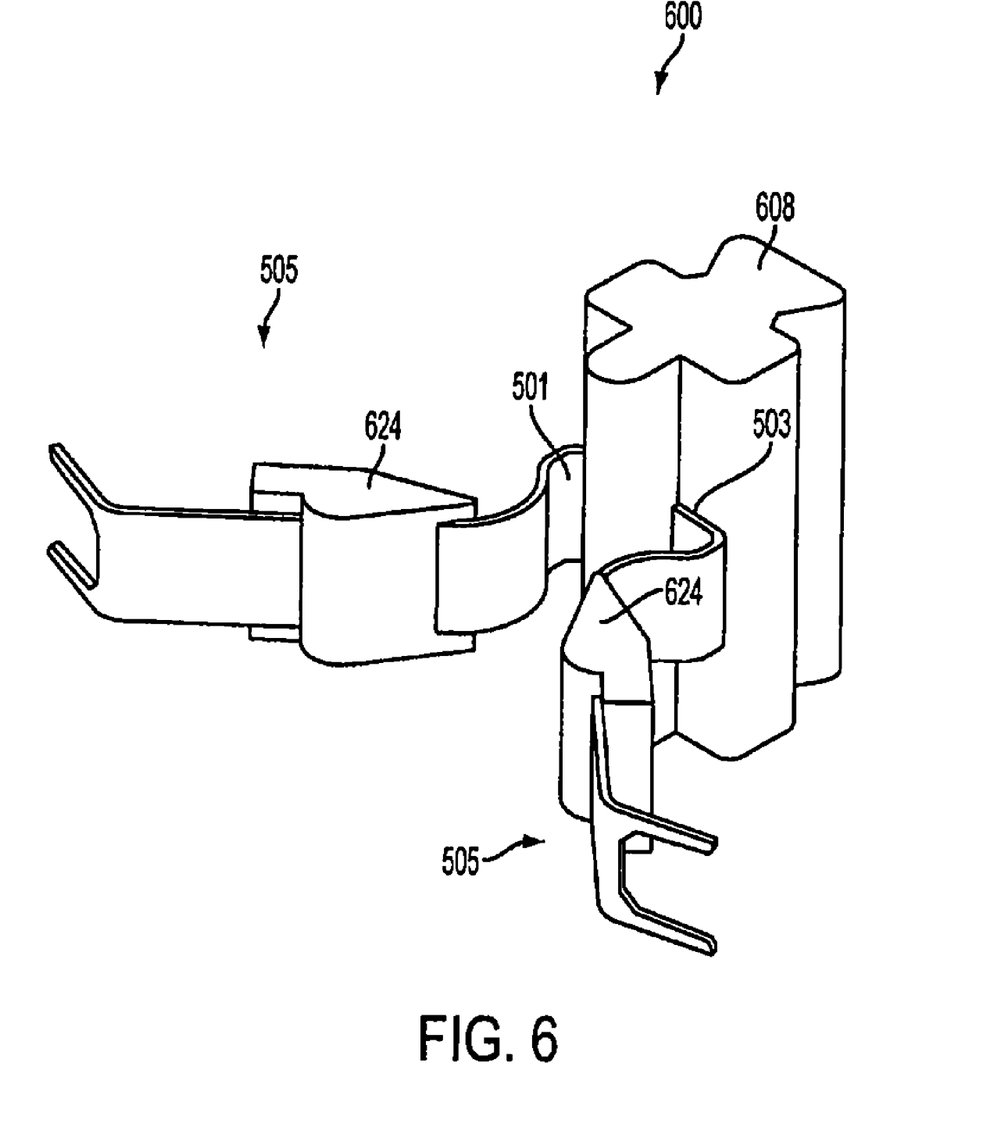
FIG. 6 shows a spring assembly in accordance with one embodiment described herein.
Figure 7:
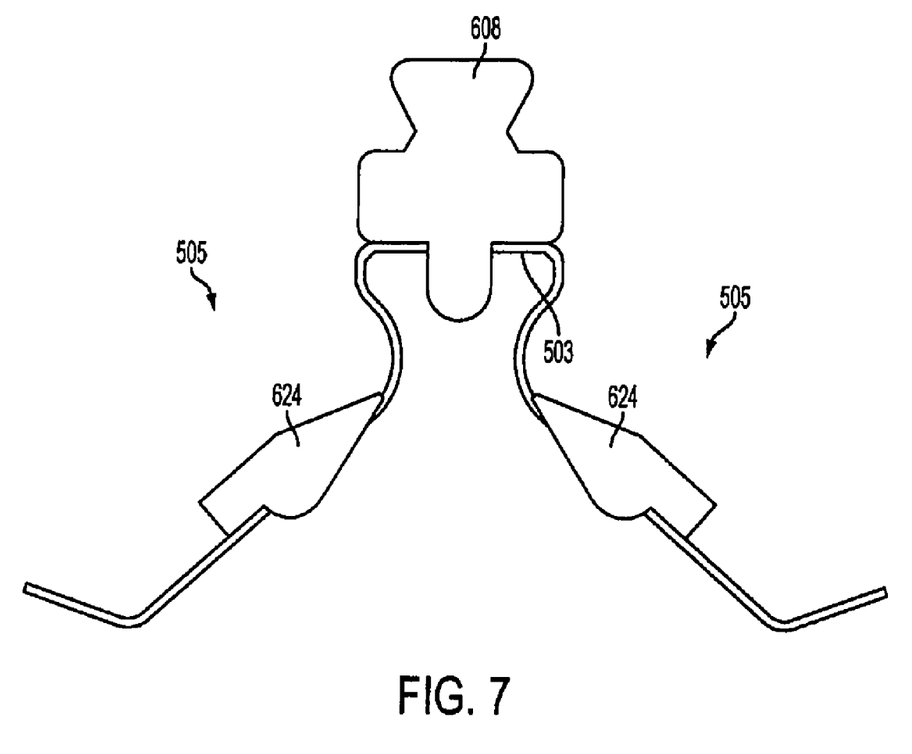
FIG. 7 is a plan view of the spring assembly of FIG. 6.

FIG. 6 shows a spring assembly 600 in accordance with one embodiment described herein. FIG. 7 is a plan view of the spring assembly of FIG. 6. Spring assembly (also referred to as actuator assembly) 600 is formed in a general wishbone-shape and includes conductive spring 501, discussed with reference to FIG. 5, having first and second arms 505 connected at a central portion 503. A coupling device 608, formed from a non-conductive material, is attached to spring assembly 600 at central portion 503. Coupling device 608 is used to couple spring assembly 600 to a housing of a patch jack or other assembly. For example, spring assembly 600 may be interchanged for spring arrangement 120 of patch jack assembly 100 illustrated in FIG. 1.

Each arm 505 of spring assembly 600 includes a non-conductive contact or actuator 624 (e.g., a plastic ramp, or the like). Non-conducting contact or actuator 624 is positioned on arms 505 to interact with a plug (not shown) inserted into a port of the jack assembly, such as ports 104, 106 (described with reference to FIG. 1) of patch jack 100 (FIG. 1).

As will be apparent to one of skill in the art, spring assembly 600 may include conductive spring 502, instead of conductive spring 501.

Figure 9:
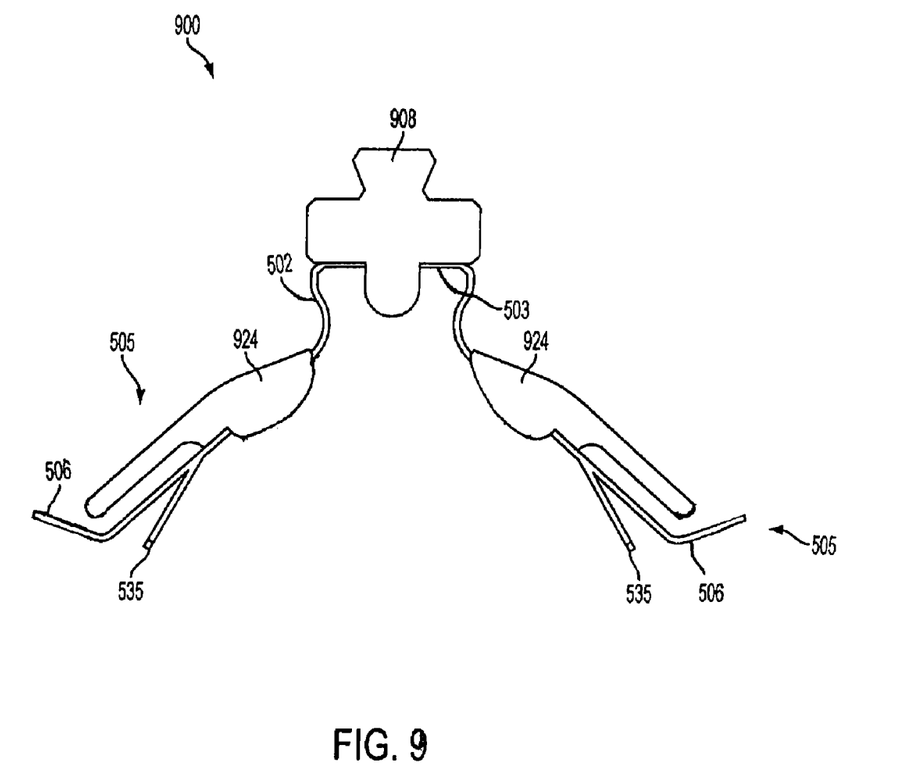
FIG. 9 is a plan view of an alternative spring assembly.

FIG. 9 is a plan view of an alternative spring assembly 900. Spring assembly (also referred to as actuator assembly) 900 is formed in a general wishbone-shape and includes spring 502, discussed with reference to FIG. 5, having first and second arms 505 connected at a central portion 503. A coupling device 908, formed from a non-conductive material, is attached to spring assembly 900 at central portion 503. Coupling device 908 is used to couple spring assembly 900 to a housing of a patch jack or other assembly. For example, spring assembly 900 may be interchanged for spring arrangement 120 of patch jack assembly 100 illustrated in FIG. 1. Also, as will be apparent to one of skill in the art, spring assembly 900 may include conductive spring 501, instead of conductive spring 502.

Each arm 505 of spring assembly 900 includes a non-conductive contact or actuator 924 (e.g., a plastic ramp, or the like). Non-conducting contact or actuator 924 is positioned on arms 505 to interact with a plug (not shown) inserted into a port, such as port 104, 106 (described with reference to FIG. 1) of patch jack 100 (FIG. 1). Actuators 924 extends along arm 505 to a point approximately adjacent to the bifurcated configuration 506 on the distal end of arm 505. As such, actuator 924 is standardized to any size plug that is inserted into the port. The length of actuator 924 prevents any short between a plug and arm 505.

Patch Jack Assembly

FIG. 8 is a perspective view of the spring assembly 600 of FIG. 6 employed in a patch jack assembly 800. Patch jack assembly 800 includes a body 802, a first end 804, and a second end 806. A first approximately cylindrical conductor 808 extends longitudinally through body 802 between a first jack 810 at first end 804 of body 802 and a second jack 812 at second end 806 of body 802. A second approximately cylindrical conductor 814 extends longitudinally through body 802 between a third jack 816 at first end 804 of body 802 and a fourth jack 818 at second end 806 of body 804. A termination post 820 (also referred to as termination resistor or ground post) is disposed within body 802 between the first conductor 808 and second conductor 814. As will be apparent to one of skill in the art, alternative configurations incorporating any number of jacks may be employed. For example, a patch jack assembly including only three jacks is considered within the scope of the jack assembly described herein.

Spring assembly 600 is coupled to body 802 via non-conductive coupling device 608. Spring assembly 600 includes conductive spring 501 having first and second conductive arms 505 extending from non-conductive coupling device 608. Each arm 505 includes a non-conductive actuator coupled thereto. Each arm 505 also includes a distal end having a bifurcated dual-beam configuration 506. Each arm 505 is biased outwardly from non-conductive coupling device 608 so as to contact a respective one of conductors 808, 814 and form an angle .theta. of about 90 degrees with the respective conductor. In alternative embodiments, each arm 505 contacts a respective one of conductors 808, 814 to form an angle .theta. between about 30 degrees and about 150 degrees. Further, each arm 505 has a first position in electrical communication with the respective conductor 808, 814 and is movable to a second position electrically isolated from the respective conductor 804, 814. For example, when a plug 12 is inserted into jack 810 of 816, arm 505 moves from the first position to the second position.

In an alternative embodiment, as mentioned above, spring assembly 600 may include conductive spring 502, instead of conductive spring 501. Use of conductive spring 502 increases the reliability of the system by taking advantage of the contact formed between secondary beam 535 and termination post 820.

In an alternative embodiment, spring assembly 600 is exchanged with spring assembly 900.

In yet another alternative embodiment, the jack assembly includes only a first, second and third jacks. For example, the jack assembly may include a body having a first end and a second end, a first approximately cylindrical conductor extending longitudinally through the body between a first jack at the first end of the body and a second jack at the second end of the body, and a second approximately cylindrical conductor extending longitudinally through the body from a third jack at the first end of the body. The jack also includes a spring assembly having first and second conductive arms extending from a coupling device. At least one arm extends outwardly from the coupling device so as to contact the first approximately cylindrical conductor. Such arm includes a distal end having a bifurcated dual-beam configuration and is movable between a first position in electrical communication with the conductor and a second position electrically isolated from the conductor. When a plug is inserted into the first jack, the movable arm moves from the first position to the second position. The opposite arm may be similarly movable or may be permanently attached to the second approximately cylindrical conductor.

CONCLUSION

While various embodiments have been described above, it should be understood that they have been presented by way of example only, and not limitation. It will be apparent to persons skilled in the relevant art that various changes in form and detail can be made therein without departing from the spirit and scope of the invention. For example, it is to be appreciated that although a patch jack is shown and described, this is an exemplary embodiment that can include electrical contact pair 400. Many other jacks known or developed in the future can also include electrical contact pair 400, as would be apparent to one of ordinary skill in the art upon reading and understanding the instant invention. For examples, jacks can have only one cylindrical conductor or multiple pairs of cylindrical conductors. All other known and future developed jacks are contemplated within the scope of the present invention. Thus, the breadth and scope of the present invention should not be limited by any of the above-described exemplary embodiments, but should be defined only in accordance with the following claims and their equivalents.

What is claimed is:

1. A jack assembly comprising:
    a body having a first end and a second end with a termination resistor disposed within the body;
    a first conductor extending longitudinally through the body between a first jack at the first end of the body and a second jack at the second end of the body;
    a second conductor extending longitudinally through the body between a third jack at the first end of the body and a fourth jack at the second end of the body; and
    a spring assembly coupled to the body, wherein the spring assembly includes first and second conductive arms extending from a non-conductive coupling device,
    wherein,
    each arm includes a distal end having a bifurcated dual-beam configuration, each arm biased outwardly from the non-conductive coupling device so as to contact a respective one of the conductors, each arm having a first position in electrical communication with the respective conductor and being movable to a second position electrically isolated from the respective conductor,
    when a plug is inserted into the first jack, the first arm moves from the first position to the second position, and
    at least one arm includes a secondary beam extending from a medial region of the arm, wherein the secondary beam comes into contact with the termination resistor when the arm is in the second position.

2. The jack assembly of claim 1, wherein the bifurcated dual-beam configuration of each arm contacts a respective one of the conductors at an approximately 90 degree angle.

3. The jack assembly of claim 1, wherein the bifurcated dual-beam configuration of each arm contacts a respective one of the conductors at an angle between about 45 degrees and about 90 degrees.

4. The jack assembly of claim 1, wherein the spring assembly further includes a non-conductive actuator coupled to each arm and positioned to interact with the respective plug to cause the arm to move to the second position.

5. The jack assembly of claim 4, wherein the non-conductive actuator extends along a length of the arm to a point approximately adjacent to the bifurcated dual-beam configuration of the arm.

6. The jack assembly of claim 1, wherein the first jack and the third jack are configured as one of a Western electric company (WECO) and a mini-WECO jack format.

7. The jack assembly of claim 1, wherein the jack assembly serves as a patch jack.

8. The jack assembly of claim 1, wherein the jack assembly serves as a high definition video dual patch module.

9. A jack assembly comprising:
    a body having a first end and a second end;
    a first conductor extending longitudinally through the body between a first jack at the end of the body and a second jack at the second end of the body;
    a second conductor extending longitudinally through the body from a third jack at the first end of the body; and
    a spring assembly having first and second conductive arms extending from a coupling device,
    wherein
    the first arm extends outwardly from the coupling device and including a distal end having a bifurcated dual-beam configuration configured to contact the first conductor at an angle of at least about 45 degrees,
    the first arm has a first position in electrical communication with the first conductor and is movable to a second position electrically isolated from the first conductor, and wherein when a plug is inserted into the first jack, the first arm moves from the first position to the second position,
    the second arm is in electrical contact with the second conductor, and
    the first arm includes a secondary beam extending from a medial region of the arm, wherein the secondary beam comes into contact with a termination resistor when the first arm is in the second position.

10. The jack assembly of claim 9, wherein the first arm further includes a non-conductive actuator attached thereto.

11. The jack assembly of claim 9, wherein the first jack and the third jack are configured as one of a Western electric company (WECO) and a mini-WECO jack format.

* * * * *